US010552689B2

(12) United States Patent
Doria et al.

(10) Patent No.: US 10,552,689 B2
(45) Date of Patent: Feb. 4, 2020

(54) AUTOMATIC OCCLUSION DETECTION IN ROAD NETWORK DATA

(71) Applicant: HERE Global B.V., Eindhoven (NL)

(72) Inventors: David Doria, Oak Park, IL (US); Xin Chen, Evanston, IL (US); Coby Spolin Parker, Santa Monica, CA (US); Zichen Li, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 110 days.

(21) Appl. No.: 15/808,277

(22) Filed: Nov. 9, 2017

(65) Prior Publication Data

US 2019/0138823 A1    May 9, 2019

(51) Int. Cl.
| | | |
|---|---|---|
| *G06K 9/00* | (2006.01) | |
| *G01S 17/89* | (2006.01) | |
| *G01S 17/42* | (2006.01) | |
| *G06T 7/521* | (2017.01) | |
| *G01S 17/93* | (2006.01) | |
| *G01S 7/48* | (2006.01) | |
| *G05D 1/02* | (2006.01) | |

(52) U.S. Cl.
CPC ........ *G06K 9/00798* (2013.01); *G01S 7/4808* (2013.01); *G01S 17/42* (2013.01); *G01S 17/89* (2013.01); *G06K 9/00791* (2013.01); *G06T 7/521* (2017.01); *G01S 17/936* (2013.01); *G05D 1/0231* (2013.01); *G06T 2207/10028* (2013.01); *G06T 2207/30252* (2013.01)

(58) Field of Classification Search
CPC ............ G06K 9/00798; G06K 9/00791; G06T 7/521; G06T 2207/10028; G06T 2207/30252; G01S 17/936; G01S 7/4808; G01S 17/89; G01S 17/42; G05D 1/0231
See application file for complete search history.

(56) References Cited

U.S. PATENT DOCUMENTS

| | | |
|---|---|---|
| 7,590,261 B1 | 9/2009 | Mariano et al. |
| 9,530,062 B2 | 12/2016 | Nguyen |
| 2015/0123968 A1 | 5/2015 | Holverda |
| 2015/0193963 A1 | 7/2015 | Chen |
| 2015/0310274 A1 | 10/2015 | Shreve et al. |
| 2016/0137206 A1 | 5/2016 | Chandraker et al. |
| 2016/0144505 A1 | 5/2016 | Fong et al. |
| 2016/0214647 A1* | 7/2016 | Weisswange ...... G06K 9/00791 |

(Continued)

OTHER PUBLICATIONS

PCT International Search Report and Written Opinion of International Searching Authority dated Feb. 27, 2019, corresponding to PCT International Application No. PCT/EP2018/080687 filed Nov. 8, 2018.

(Continued)

*Primary Examiner* — Jon Chang
(74) *Attorney, Agent, or Firm* — Lempia Summerfield Katz LLC

(57) ABSTRACT

The present embodiments provide for automatically detecting the location and severity of occluded regions within input data. A grid representation of a scene is generated from a data set, characterizing spaces of the grid representation as free, occupied, and hidden/occluded. The grid is bounded, and a connected component analysis is performed on the hidden space to identify the occluded regions.

18 Claims, 11 Drawing Sheets

(56) References Cited

U.S. PATENT DOCUMENTS

2017/0369051 A1* 12/2017 Sakai .................. B60W 30/09

OTHER PUBLICATIONS

Enric Galceran et al. "Augmented Vehicle Tracking under Occlusionsfor Decision-Making in Autonomous Driving" pp. 1-7, Dec. 17, 2015.
Stiller et al. "Probabilistic Models for 3D Urban Scene Understanding from Movable Platforms" pp. 1-144, Jan. 2013.
Theodore C. Yapo et al, "A Probabilistic Representation of LiDAR Range Data for Efficient 3D Object Detection" Department of Electrical, Computer, and Systems Engineering Department of Computer Science Rensselaer Polytechnic Institute, pp. 1-8, Jul. 23, 2008.

* cited by examiner

AUTOMATIC OCCLUSION DETECTION IN ROAD NETWORK DATA

FIELD

The following disclosure relates to three-dimensional (3D) occlusion detection, and more particularly to 3D map generation, navigation and autonomous driving.

BACKGROUND

Autonomous driving, augmented reality and navigation applications often rely on three-dimensional (3D) object detection based on a 3D map or model of a local scene. For example, to take advantage of high-definition 3D maps, autonomous vehicles sense the environment surrounding the vehicle and match the environment to the 3D map using a process called localization. The localization process relies on pertinent objects, structures and other localization objects in the vehicle environment to be present in the 3D map.

Gaps in a 3D map, such as missing objects, structures and/or other localization objects, may be detrimental to the performance of localization algorithms. Gaps in the 3D map often exist due to "false negatives" generated by object detection algorithms, frequently due to missing input data. For example, one reason for missing input data is the presence of a light detection and ranging (LIDAR) occlusion (aka as LIDAR "shadows"), such as when a temporary object (e.g., a semi-truck) is positioned between the LIDAR scanner of a data collection vehicle and pertinent objects on the side of the road intended to be captured. In this example, the LIDAR scanner only captures data of the semi-truck, resulting in a LIDAR occlusion and a false negative for the pertinent roadside objects blocked by the semi-truck.

SUMMARY

In one embodiment, a method for detecting an occlusion from point cloud data is provided. The method includes receiving point cloud data for a scene by a server from a data collection vehicle and generating a grid representation of a region of interest in the scene by the server from the point cloud data. The grid representation includes free space, occupied space and hidden space. The method also includes identifying an occlusion in the region of interest based on the hidden space of the grid representation by the server.

In another embodiment, an apparatus for detecting an occlusion from light detection and ranging (LIDAR) data is provided. The apparatus includes at least one LIDAR sensor, at least one processor, and at least one memory including computer program code for one or more programs. The memory and the computer program code is configured to, using the processor, cause the apparatus to receive LIDAR data for a region of interest from the LIDAR sensor and to assemble the LIDAR data as point cloud data in a spatial data structure. The memory and the computer program code is also configured to cause the apparatus to generate a grid representation of the region of interest by evaluating the spatial data structure to characterize squares/cubes/voxels of the grid as a free square, an occupied square, or a hidden square, to detect an occlusion in the LIDAR data based on hidden squares/cubes/voxels of the grid representation, and to generate a localization model from the LIDAR data and the detected occlusion.

In another embodiment, a non-transitory computer readable medium is provided including instructions that when executed are operable to receive sensor data for a scene, the sensor data comprising an origin point and an end point, and to generate a grid for the scene from the sensor data. Generating the grid includes tracing a path from the origin point to the end point to identify free space, occupied space and hidden space. The instructions also include detecting objects in the scene from the occupied space and identifying an occlusion comprising a false negative in the detected objects from the hidden space.

BRIEF DESCRIPTION OF THE DRAWINGS

Exemplary embodiments of the present invention are described herein with reference to the following drawings.

DETAILED DESCRIPTION

The present embodiments provide for automatically detecting the location and severity of occluded regions within input data. The detected occlusions may be used to indicate where additional data may be collected to supplement the input data set, or to report that a gap exists within the input data set. By detecting occlusions, the resulting 3D map/model based on the input data can be made more accurate and comprehensive.

For example, using a light detection and ranging (LIDAR) data set, a grid representation of the environment is generated by ray tracing (e.g., traversal) the LIDAR data points to track and characterize spaces of the grid representation as free, occupied, and hidden/occluded. The grid is then bounded, such as using a lane model for a roadway, keeping only a portion of the grid representation (e.g., space occupancy information inside the roadway). In this example, the grid is bounded to determine occlusions from temporary objects in the roadway that block a view of stationary roadside objects by a LIDAR scanner. A connected component analysis is then performed on the hidden space inside the lane model to identifying connected regions of hidden space, and thresholding the resulting connected regions of hidden space by size to indicate where LIDAR occlusions exist.

In an embodiment of generating a 3D vehicle localization map/model, data collection vehicles are typically deployed using rooftop mounted scanners/sensors (e.g., LIDAR, laser, Doppler, camera, etc.) for collecting 3D data used to map/model objects adjacent to a roadway. The roadside objects include objects visible to vehicles traveling on the roadway, such as light poles, signs, guard rails, bridges, etc. The data collection vehicle captures 3D data for a region of interest while traveling the roadway. The region of interest is often bounded, such as by a distance (e.g., 15 meters extending beyond a roadway boundary). Object detection algorithms are then used to identify the roadside objects to generate the vehicle localization model. The vehicle localization model for the roadway may be used later to identify a location of a vehicle (e.g., an autonomous vehicle or mobile device), such as by matching vehicle sensor data to the localization model. Ideally, the data collection vehicle would travel the roadway in isolation, without traffic and other temporary objects on the roadway, providing an unobstructed view of the entire roadway and all roadside objects. In practice, there is typically traffic and other temporary objects randomly obscuring the view of data collection vehicle.

Figure 1:
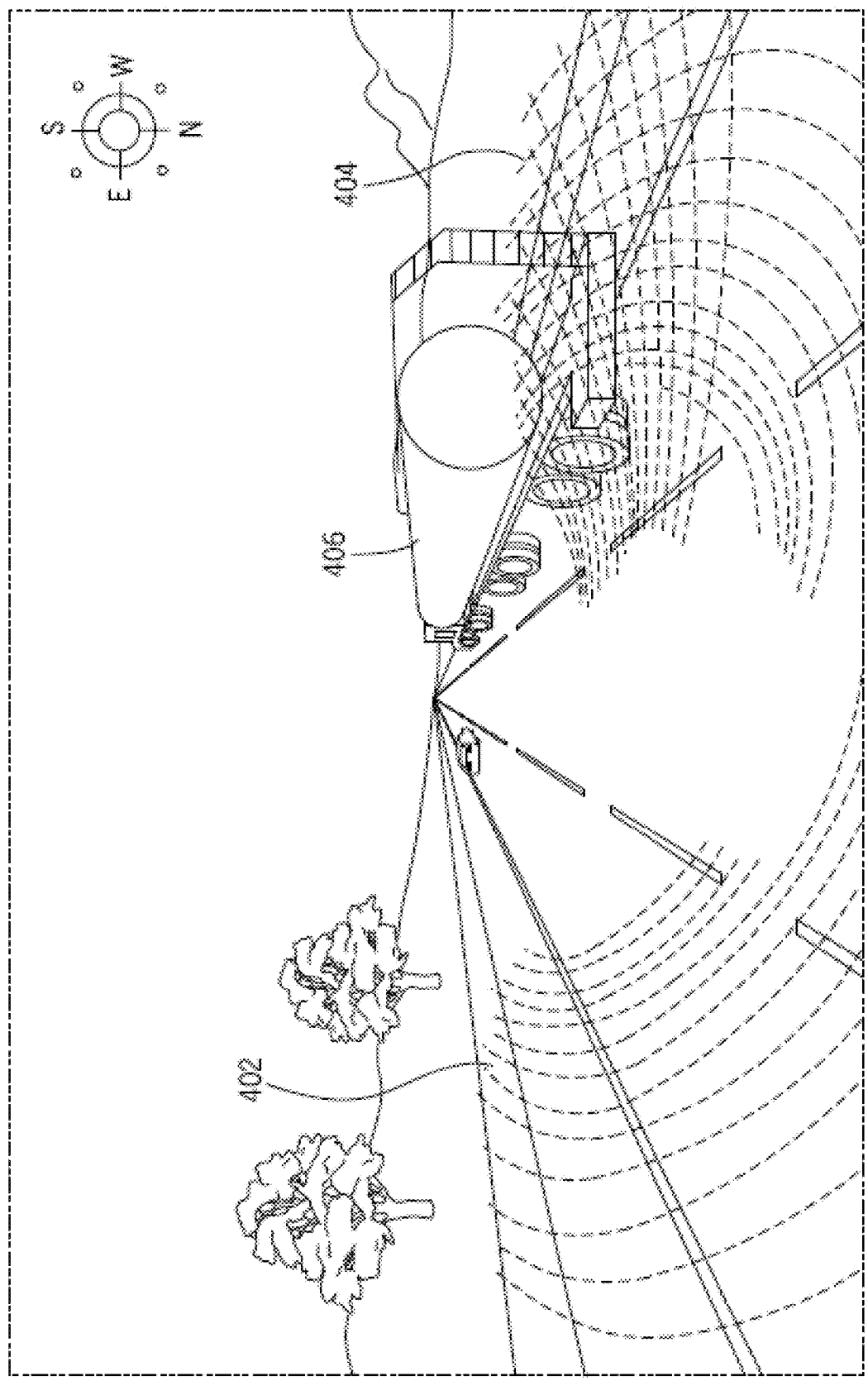
FIG. 1 illustrates an example of an image captured from the perspective of a data collection vehicle.
Figure 2:
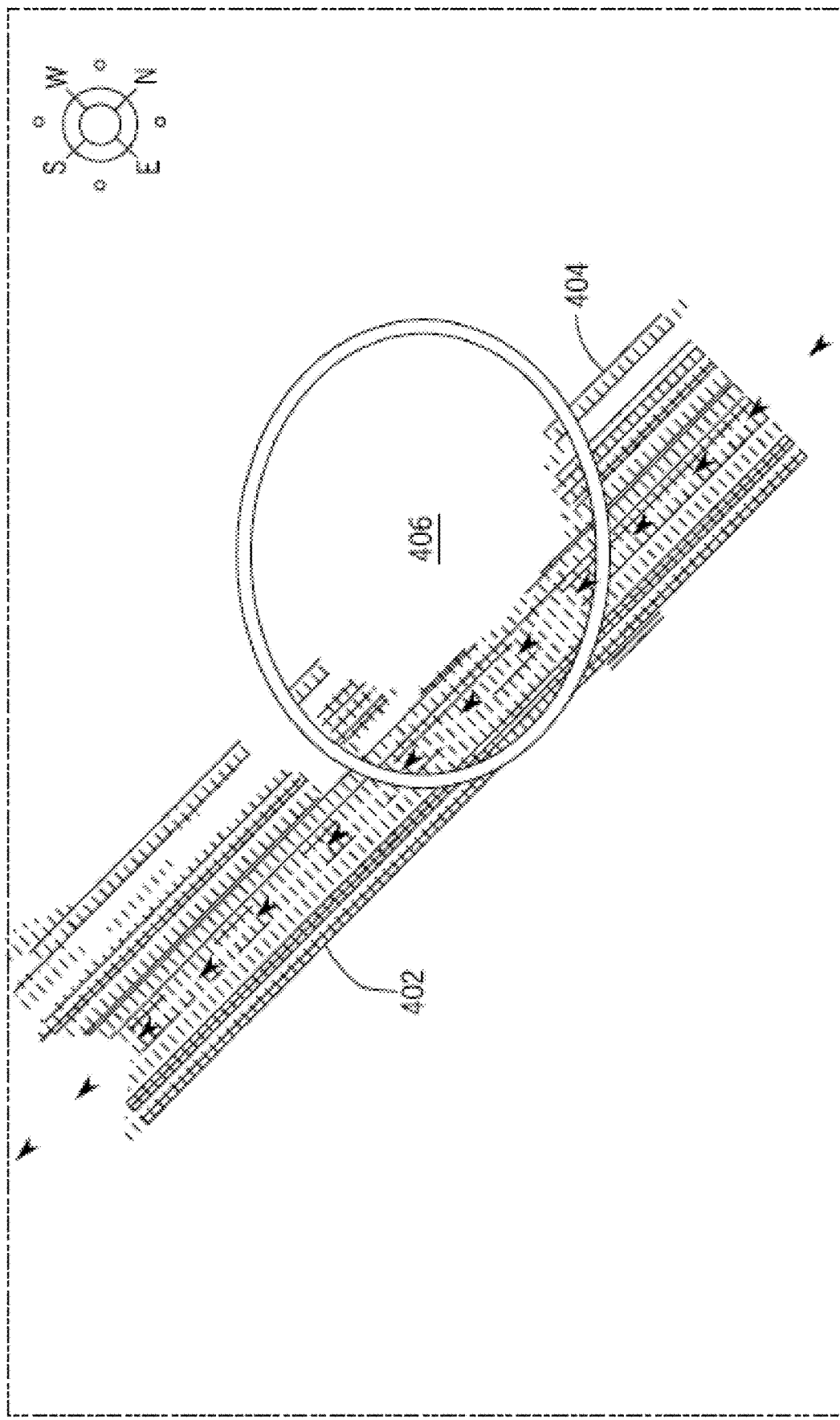
FIG. 2 illustrates an example of an occlusion in sensor data collected by the data collection vehicle.

FIG. 1 illustrates an example of an image captured from the perspective of a data collection vehicle. The perspective camera image shows the view of the data collection vehicle, sensor data collection 402 of the left roadway boundary and sensor data collection 404 of the right roadway boundary. The perspective camera image shows a large tanker truck 406 that will cause an occlusion in the sensor data collected by the data collection vehicle (the occlusion is shown in FIG. 2, as discussed below). As depicted, the tanker truck 401 obscures the data collection vehicle's view and sensor data collection 404 (e.g., roadside objects bordering the right side of the roadway).

FIG. 2 illustrates an example of an occlusion in sensor data collected by the data collection vehicle. The triangles in the left lane indicate the path of the data collection vehicle traveling through the roadway. The sensor data collected by the data collection vehicle includes a substantially complete data set for data collection 402 of the left roadway boundary (i.e., no traffic obstructions) and a partial data set for data collection 404 of the right roadway boundary. FIG. 2 illustrates a gap in the data set corresponding with the large tanker truck 406 obscuring the view of the sensors of the data collection vehicle. As a result of the large tanker truck 406 obscuring the view of the sensors of the data collection vehicle, a 3D vehicle localization map/model generated from the collected data will be incomplete. Further, object detection algorithms may generate a false negative indicating that no roadside objects exist in the area obscured by tanker truck 406, resulting in a conclusion that is detrimental to the mapmaking process.

Figure 3:
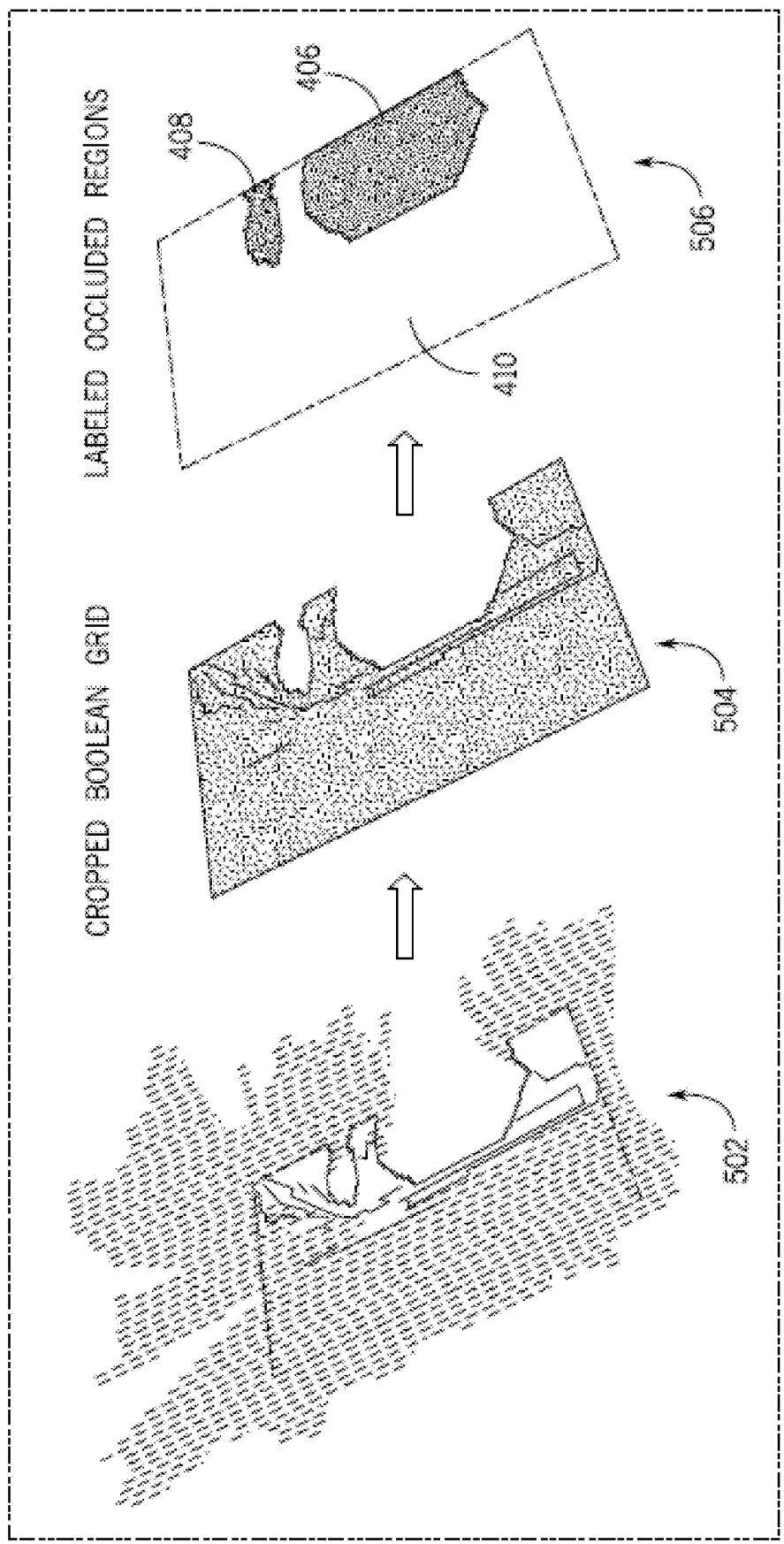
FIG. 3 illustrates an embodiment detecting an occlusion using sensor data collected by the data collection vehicle.

FIG. 3 illustrates an embodiment detecting an occlusion using sensor data collected by the data collection vehicle. For example, an algorithm is applied to the sensor data (e.g., LIDAR data) to automatically detect occlusions. The sensor data is first stored using a spatial data structure 502. The spatial data structure 502 includes every data point collected by the data collection vehicle. The sensor data is typically three-dimensional data. The sensor data may be of any N-dimensions (e.g., N>2).

For example, the spatial data structure uses all data points collected in the area of the vehicle construct a full probabilistic octree. Other spatial data structures may be used, such as a kd-tree, binary space partitioning (BSP-tree), etc. A spatial data structure, such as a probabilistic octree, provides for intelligently representing the sensor data rather than arbitrarily representing the sensor data (e.g., in a random list of points, etc.). Using a spatial data structure allows for organizing the sensor data leveraging information from the data points, such as grouping sensor data points by geometric location, etc., allowing sensor data points to be organized in relation to other data points. In an example, sensor data points are grouped (e.g., by binning data points) based on closeness of each data point to other data points (e.g., points within 10 cm). Alternatively, sensor data points are grouped based on locations in a grid representing every location for the sensor data points, and each sensor data point is binned according to a grid location. In this example, the sensor data points may be searched in reference to a grid location, or by searching for data points in relation to another grid location (e.g., all points within 10 cm of a grid location). Additional and different ways of grouping/binning may be used. For example, the data points may be binned by in a data dependent manner, such as by dividing the total number of points equally or dividing by assigning weights to the data points.

Referring back to FIG. 3 at 504, the sensor data stored the spatial data structure 502 is cropped/clipped and a grid is constructed from the cropped/clipped sensor data. In an embodiment, the sensor data is cropped/clipped based on a region of interest or other boundary conditions. For example, when constructing a localization model for a highway, occlusions typically exist due to traffic and other temporary objects on the roadway during data collection. In this example, the localization model is generated to capture stationary roadside objects, such as buildings, signs, guardrails, etc. (i.e., objects within a region extending 15 meters from the road boundaries). As such, a region of interest for highway occlusions may be defined by the boundaries of the highway. Other regions of interest may be defined based on additional and/or different boundary conditions.

As depicted at 504, boundary conditions are applied to the sensor data. For example, known lane boundaries are used to crop/clip the sensor data to include only sensor data points within the roadway. For example, roadway boundary conditions may be applied from a previously generated lane model for the highway. As such, cropping/clipping the sensor data to define a region of interest limits the locations where an algorithm may detect occlusions. Additional and different boundary conditions may also be applied, such as a height threshold (e.g., nothing higher than 3 meters) for temporary objects on the roadway.

Using the cropped/clipped sensor data, a grid 504 is generated. For example, a cropped Boolean grid is constructed from the data remaining after a region of interest is defined and applied. Grid 504 depicts cells with data points after cropping/clipping the sensor data 502. Referring to grid 504, the left side of the highway depicts a solid line, indicating that sensor data exists for each square of grid 504. The right side of the grid depicts blank spaces of the grid, indicating possible occlusions existing in those location, such as by the tanker truck depicted in FIG. 1.

In an embodiment, each grid cell/space is defined as free, occupied, or hidden/unseen based on the sensor data. For example, free spaces may be defined as portions of a roadway without any temporary or permanent objects. Occupied spaces may be defined as portions of the roadway with a temporary or permanent object. Hidden/unseen spaces may be defined as portions of the road without any sensor data. Additional and/or different grid cell/space definitions may be used. For example, each grid cell/space may be defined as traversed or untraversed, hidden or not hidden, etc. based on the sensor data.

Applying boundary conditions, as discussed above, constrains the interpretation of the hidden space. For example, without boundary conditions (e.g., a lane model), hidden spaces will extend in every direction beyond detected objects and for all spaces beyond a sensor range (e.g., beyond a typical 50 meter range of a LIDAR scanner). Accordingly, applying the boundary conditions constrains interpretation of the hidden spaces to an area of interest, such as for occlusions preventing a data collection vehicle from capturing data for roadside objects.

In an example, traversing/tracing LIDAR rays through the region of interest (as discussed below) is used to define each cell/space of grid 504 as free, occupied, hidden/unseen, etc. Typically, using sensor data as a point cloud (e.g., LIDAR point cloud data, etc.), data points between the sensor and a detected object are lost and/or ignored. For example, utilizing free space modeling, additional data points are generated for locations between a sensor and detected objects for each sensor data point. The data points between the sensor and the detected objects are defined as having no objects (e.g., otherwise, a LIDAR ray would not traverse the locations). Other interpretations of the sensor data may be used to define the grid cells/spaces of grid 504.

Figure 4:
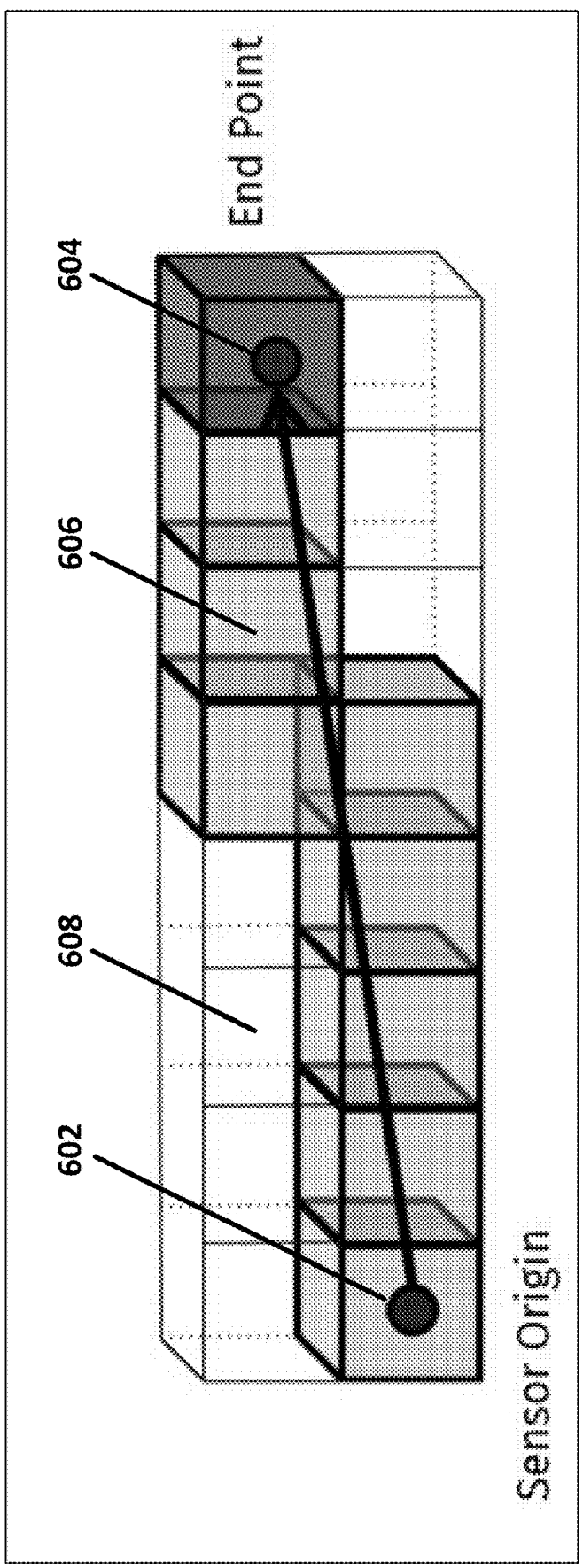
FIG. 4 illustrates an embodiment of ray traversal for a sensor data point.

FIG. 4 illustrates an embodiment of ray traversal for a sensor data point. For example, FIG. 4 depicts a portion of three-dimensional grid that is two voxels high, eight voxels wide and one voxel deep. A sensor ray is traversed from a sensor origin 602 to end point 604. The end point 604 is within the area of interest and represents a temporary object (e.g., an occlusion, etc.) or a permanent object (e.g., an object to include in the localization model, etc.). The ray is traversed, such as by overlaying the ray from the sensor origin 602 to end point 604 on the grid, and grid spaces may be characterized based on information gained by traversing the ray. Grid spaces between the sensor origin 602 and end point 604, such as free space 606, are determined to be free from objects because any object would obstruct the ray from reaching end point 604. The grid space corresponding to the sensor origin 602 may also be characterized as a free space because the sensor origin may be assumed that the data collection vehicle or sensor cannot be located in the same grid space as an object. No information may be obtained from untraversed spaces 608.

By traversing the ray, free spaces (e.g., cells traversed between sensor origin 602 and end point 604, and the cell containing sensor origin 602), an occupied space (e.g., the cell containing end point 604), and hidden/unseen spaces (e.g., untraversed cells 608, and cells beyond the end point 604 by extrapolating the ray) may be defined. The free spaces 606 and untraversed spaces 608 may be stored in the spatial data structure (e.g., point cloud locations marked an octree as free or an unseen locations) and used for generating grid 504. In an example, a probabilistic octree assigns probabilities to the free spaces 606 and untraversed spaces 608. The probabilities may be used to determine whether a grid space of grid 504 will be characterized as free, occupied, or hidden/unseen.

Probabilities are assign based on multiple characterizations of the same location by the sensor data. In one example, a zero percent (i.e., 0% or a binary 0) probability of hidden space is assigned to locations with at least one free or occupied data point assigned to the locations, and a one hundred percent (i.e., 100% or a binary 1) probability is assigned to all locations without data points. Alternatively, different probability levels may be assigned to the different locations. For example, different probability levels of hidden space may be assigned based on whether locations were never traversed, or if locations had fewer data points than other locations (e.g., if a location has a single-digit quantity of data points rather than a hundred or more data points, representing a different order of magnitude of data points). Different probability levels may be assigned based on how conservative a localization model is defining occlusions. For example, if a threshold number of data points is defined for determining probability levels (e.g., at least one hundred data points), locations that were traversed fewer than the threshold are deemed inconclusive and are assigned a hidden space probability. In this example, if a location was only traversed three times, a probability of ninety seven percent (i.e., 97% or $^{97}/_{100}$) probability of hidden space is assigned. Alternatively, locations that were traversed fewer than the threshold may be deemed completely inconclusive, are assumed to be hidden space, and are assigned a one hundred percent (i.e., 100%) probability of hidden space. Additional and different metrics for assigning hidden space probabilities may be used.

In an embodiment, referring back to FIG. 3 at 504, thresholding may be performed to determine hidden spaces based on the assigned probabilities. As depicted at 504, region of interest is thresholded as free (e.g., grid of squares depicting unhidden space) or hidden (e.g., no squares depicted for hidden space). After thresholding, the hidden space is labeled as occluded regions. For a two-dimensional grid, grid squares may be used. For a three-dimensional grid, grid cubes or voxels may be used.

At 506, two occluded regions are labeled. In an embodiment, the spatial data structure may be analyzed to characterize and label the occlusions with additional information (e.g., including a source of the occlusion, whether the occlusion is temporary, etc.). A map database (e.g., the localization model) may be updated based on the labeled occluded regions. Referring to 506, two occluded regions 406, 408 are labeled. The two occluded regions correspond to the tanker truck 406 depicted in FIG. 1. For example, the occluded regions are identified and labeled based on artifacts of an octree, such as when large regions of hidden space existed in the region of interest in a particular shape. Analyzing the hidden space provides cues that the occlusion existed during data collection.

In an embodiment, the hidden space is analyzed using connected component analysis. Connected component analysis is an image processing technique, where based on a defined similarity metric, a region is grown from a seed point until a stopping criteria is satisfied. In this embodiment, occluded regions 406, 408 are grown from a seed point (e.g., a hidden space) to identify other hidden spaces connected to the seed point. As such, large sections of hidden space are identified and thresholded as disjointed sets of voxels making up the hidden space. In 506, occluded region 406 is identified as one connected component and occluded region 408 is identified as a second connected component. The free space 410 may also be identified as a third connected component. The connected components may be used to analyze occlusion sources.

For example, shape analysis, statistical analysis, etc. may be performed to determine the reason for the hidden spaces. By analyzing the occluded regions, a source of the occlusion may be determined. For example, the occluded regions 406, 408 correspond to a pattern for a truck. The occluded region 406 corresponds to the shape of a truck cab and occluded region 408 corresponds to the shape a truck body. Other patterns may be identified based on different types of occlusions (e.g., walls, barriers, construction signs, etc.). Analysis of the occluded regions 406, 408 may also characterize the occluded regions 406, 408 as traffic, temporary occlusions, permanent occlusions, construction occlusions, etc.

In an embodiment, analysis of the occlusions may drive a decision to collect and/or incorporate supplemental additional sensor data, or to report/map an occlusion location. For example, if the source of an occlusion is based on a temporary object, such as the truck 406, targeted remapping may be performed by collecting supplemental sensor data for the occlusion locations 406, 408. If the source of an occlusion is a permanent object, such as a wall, targeted remapping may be unsuccessful because the occlusion is likely to appear in the remapping. One or more different actions may be taken after analyzing the occlusion, such as incorporating supplemental data or update the map database with a false negative (e.g., instruction to proceed with caution and/or report that no data exists for that location).

The present embodiments may substantially improve mapmaking processes by automatically detecting occlusions in sensor data. By detecting occlusions, false negatives may be reduced or eliminated, increasing the accuracy and completeness of the resulting map. Further, by detecting and analyzing the occlusions, additional data may be integrated in the mapmaking process efficiently, by including additional data in the mapmaking process through targeted remapping, integrating supplemental data, and/or labeling areas in the map as potentially false negative regions.

The present embodiments may also substantially improve activities relying on a generated map for localization, such as autonomous driving, navigation and augmented reality. For example, by providing an improved map generated based detecting occlusions, the map may be more accurate, allowing autonomous vehicles, navigation devices and/or an augmented reality devices to determine a location of the vehicles and/or devices, increasing safety, increasing accuracy, and providing a better user experience. In addition to using the improved map, occlusions may be detected in real-time by an autonomous vehicle and/or a mobile device, allowing for improved localization by better matching detected objects to the map. For example, by detecting occlusions in real-time, an autonomous vehicle and/or mobile device may better detect temporary and permanent objects in a scene, allowing the vehicle and/or mobile device to better determine a location, to provide a better display to a user, etc. Augmented reality applications may also be improved by better understanding a scene around the device by detecting occlusions.

Figure 5:
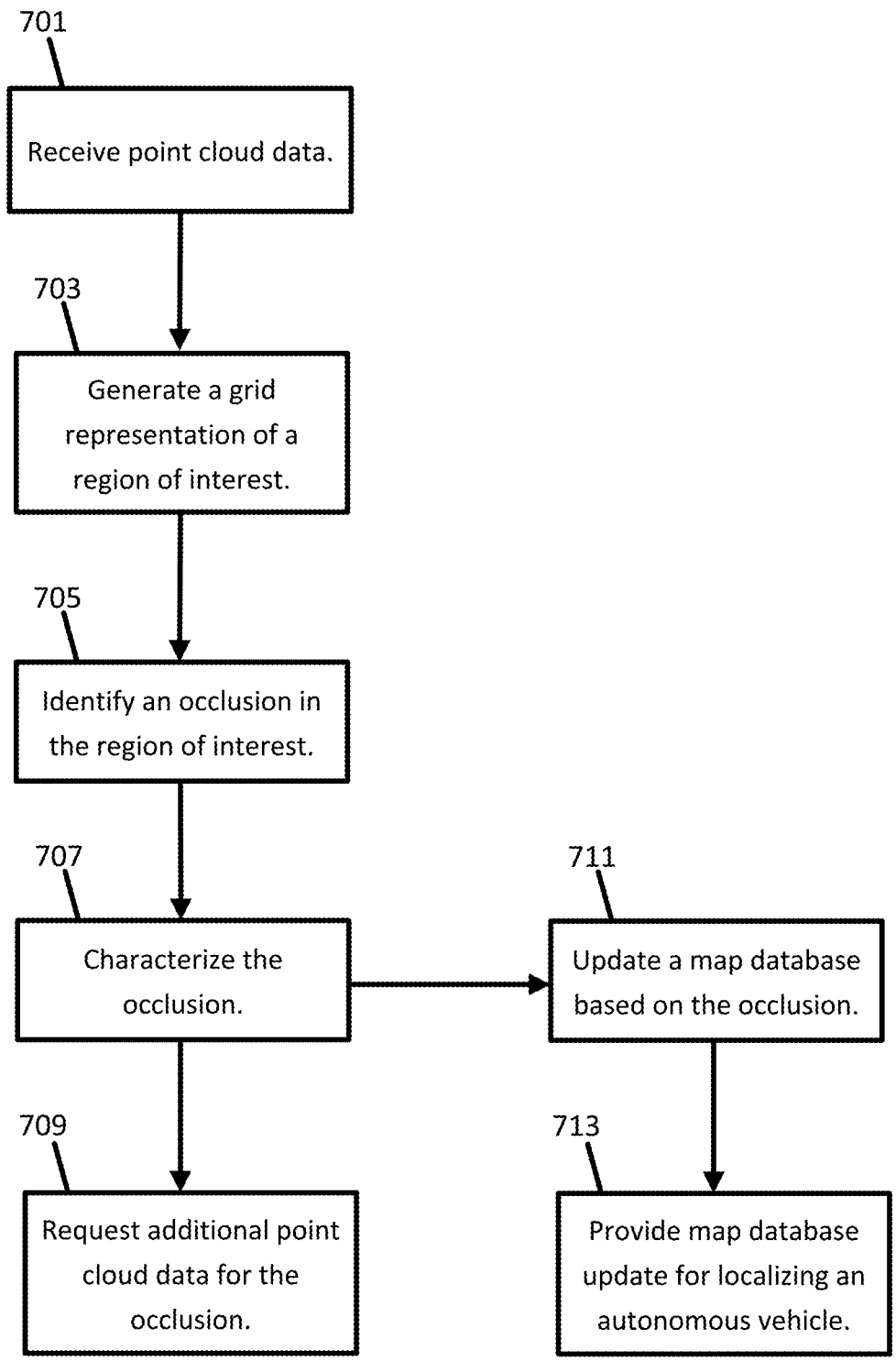
FIG. 5 depicts an example flowchart for detecting an occlusion from point cloud data.

FIG. 5 depicts an example flowchart for detecting an occlusion from point cloud data. The method is implemented by the system of FIGS. 6-10 (discussed below) and/or a different system. For example, referring to FIG. 6 (discussed below), the method may be performed by a server 125 and developer system 121. The point cloud data may be collected by an autonomous vehicle or another mobile device, such as mobile device 122 as probe 131. Additional, different or fewer acts may be provided. The method is provided in the order shown. Other orders may be provided and/or acts may be repeated or performed in parallel.

The occlusions may be detected from point cloud data for mapmaking. In an embodiment, two stages or layers of mapmaking are performed. For example, to map roadways, a lane model is generated to identify and map painted lines on the roadway. A localization model is then generated to identify roadside objects. Occlusions may be detected during both stages of mapmaking. Different regions of interest are defined for each stage.

Figure 7:
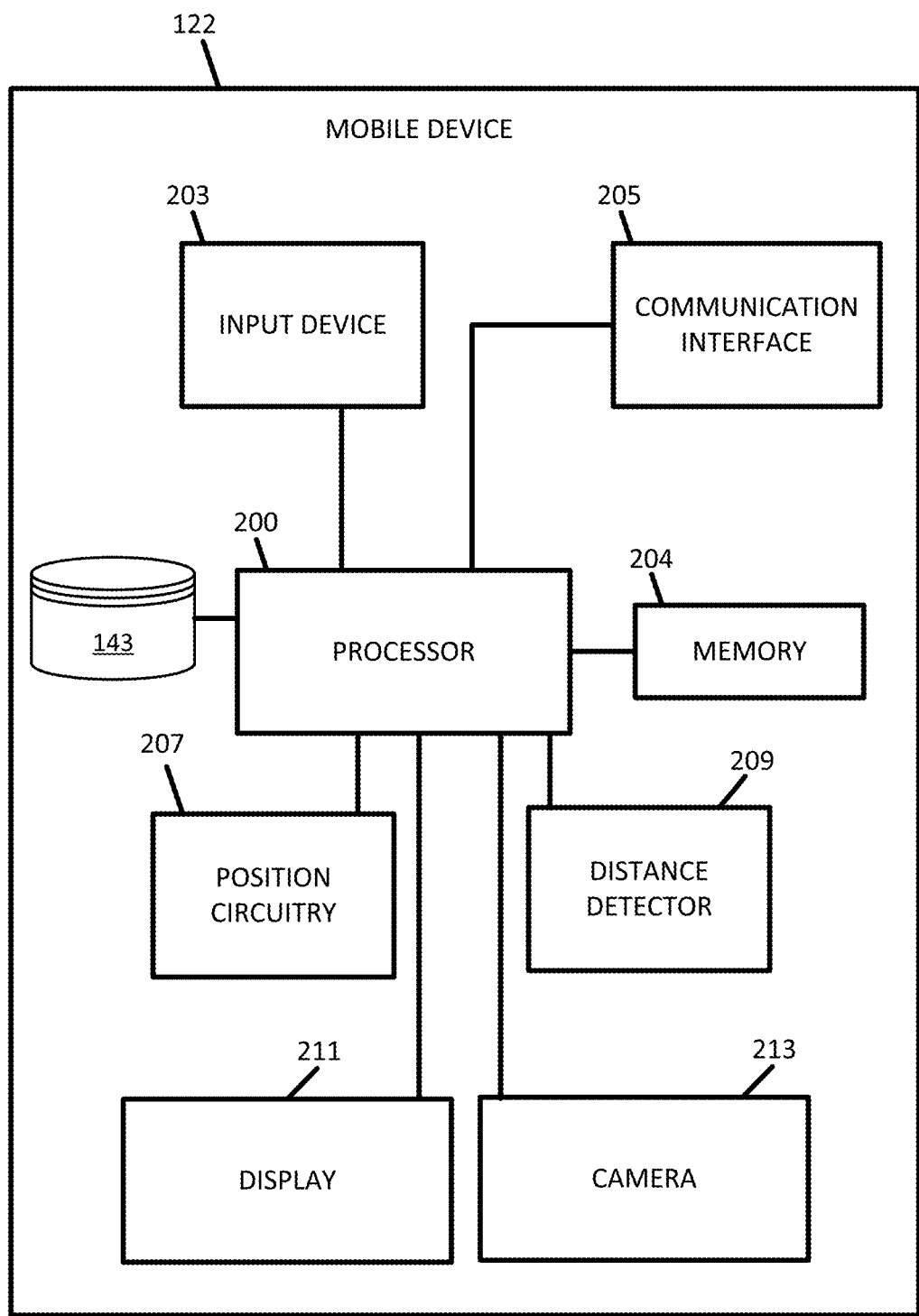
FIG. 7 illustrates an example mobile device.

Referring back to FIG. 5, at act 701, point cloud data for a scene is captured or received. For example, the point cloud data is received from a data collection vehicle (i.e., a mobile device 122) to a cloud based server 125 over a network 127. The cloud based server 125 may store the point cloud data in a database 123. Referring to FIG. 7 (discussed below), the data collection vehicle may employ a distance detector 209 (e.g., a LIDAR scanner). In an embodiment, the data collection vehicle includes a plurality of laser and receivers deployed in different directions (e.g., thirty two lasers tilted in different angles and directions). Alternatively, the distance detector 209 may be one or more cameras or other sensors used to capture point cloud data. The point cloud data is stored by the server 125 in a spatial data structure, such as a probabilistic octree. In an embodiment, the complex geometries of LIDAR sensor data (i.e., caused by spinning sensors and vehicle movement) are combined into the octree representation.

Referring back to FIG. 5, at act 703, a grid representation is generated for a region of interest in the scene. The grid representation is generated by the server 125 using a developer system 121 from the point cloud data stored in database 123. The region of interest is based on any defined boundary conditions for the scene. In an example, when generating a localization model for a roadway, the region of interest is defined based on a traffic lane model for the roadway stored by the server 125 in database 123. In an embodiment, the grid is generated by identifying free spaces, occupied spaces and hidden spaces from the point cloud data. For example, the free spaces correspond to locations between each sensor location and a corresponding object location identified by the sensor, the occupied spaces correspond to the object locations identified by, and the hidden spaces correspond to locations without sensor data. The free, occupied and hidden spaces are identified by analyzing the point cloud data, such as using the probabilistic octree representation. In an example, three LIDAR rays may have inconsistent data. The probabilistic octree consolidates the data and assigns a probability of occupancy for each location. For example, if the point cloud data includes three data points for the same location, two free and one occupied, a sixty six percent (i.e., 66% or ⅔) probability as free and a thirty three percent (i.e., 33% or ⅓) probability as occupied may be assigned to that location. Probabilities of each location may be used to generate the grid representation, such as by applying threshold probabilities to characterize each space.

At act 705, an occlusion is identified in the region of interest. The occlusion is identified by the developer system 121 of the server 125 based on the hidden spaces of the grid representation. The location of the occlusion is identified, and according to an embodiment, the severity of the occlusion is also identified. For example, the severity of the occlusion may include the size and completeness of the occlusion. For example, a partial occlusion may be caused by a small temporary object, such as a small vehicle in the vicinity of the data collection vehicle. The partial occlusion may not fully occlude the view of roadside object, but may lower the sampling rate by the data collection vehicle (e.g., no full gaps in sensor data, but a lower sampling rate cause by some rays hitting roadside objects and other rays hitting the small vehicle). An occlusion may be characterized as a full occlusion, such as the entire size of tanker truck 406 blocking all roadside objects. Therefore, different intermediate levels of occlusions may be defined.

At act 707, the occlusion is characterized by the developer system 121 of the server 125 based on the shape of the hidden spaces. For example, the shape of the hidden spaces is determined by connected component analysis of the hidden spaces, and the occlusion is characterized as a temporary occlusion or a permanent occlusion. Further, a source of the occlusion may also be determined.

At act 709, a request for supplemental point cloud data is generated for the location associated with the occlusion. For example, the request is generated by the developer system 121 of the server 125 after characterizing the occlusion as the temporary occlusion. Alternatively or additionally, at act 711, the map database 123 stored on the server 125 is updated based on the occlusion and/or supplemental point cloud data.

At act 713, the updated map database 123 is provided to a map database 122 of an autonomous vehicle (i.e., another mobile device 122) for localizing the autonomous vehicle in the scene. Using the updated map database 133, the autonomous vehicle senses the environment surrounding the vehicle and matches the environment to the updated map database 133. For example, the autonomous vehicle senses roadside objects and structures, and based on matching the objects and structures to the same objects and structures in the updated map database, a location of the autonomous vehicle may be determined. After determining a location, the autonomous vehicle may navigate and control the vehicle.

Figure 6:
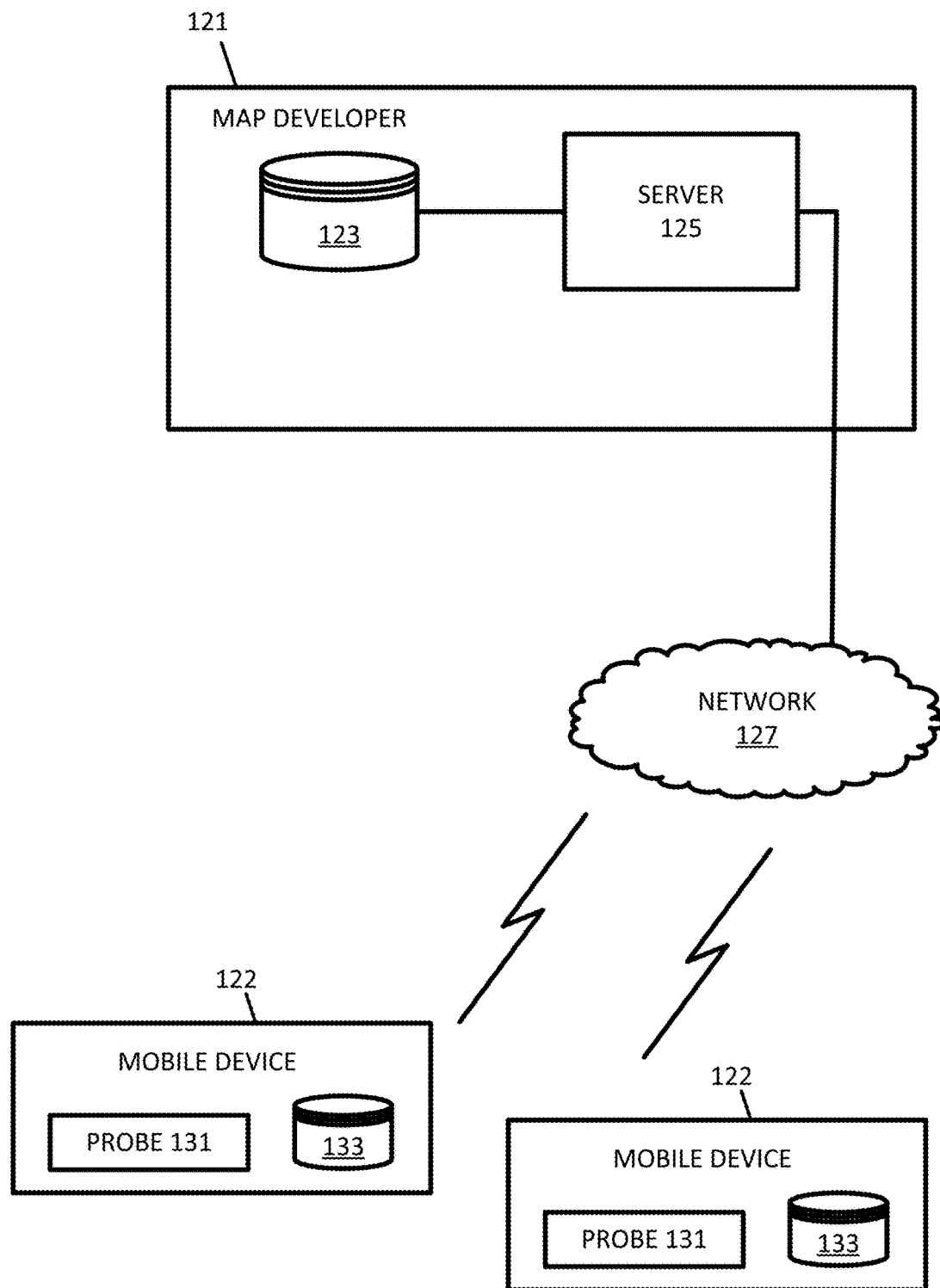
FIG. 6 illustrates an example system for map updates.

FIG. 6 illustrates an example system 120 for map database updates. In FIG. 6, one or more mobile devices 122 include probes 131 and are connected to the server 125 though the network 127. A database 123, including the server map, is also connected to the server 125. The server map may include a lane model and a localization model. The database 123 and the server 125 make up a developer system 121. The developer system 121 is used to generate server map updates based on data collected by the probes 131. Multiple mobile devices 122 are connected to the server 125 through the network 127. The mobile devices 122 may serve as probes 131 or be coupled with probes 131. The probes 131 collect point cloud data used by the developer system 121 to update the server map. The mobile devices 122 may also include autonomous vehicles. The mobile devices 122 include databases 133 corresponding to device maps. The device maps may be updated based on the server map. Additional, different, or fewer components may be included.

For example, point cloud data is collected by data collection vehicles and/or other mobile devices 122 to update the server map at the server 125. The data collection vehicles and/or other mobile devices 122 do not update vehicle maps directly. Instead, the data collection vehicles and/or other mobile devices 122 capture sensor data using probes 131, and upload the sensor data to the server 125. The server 125 sends out periodic map updates to the data collection vehicles and/or other mobile devices 122 based on aggregating sensor data from the mobile devices 122 and updating the server map using the aggregated sensor data. For example, autonomous vehicles, navigation devices, and augmented reality devices receive map updates from the server for localizing the vehicles and devices in an environment based on a local map database 143.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile devices 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

FIG. 7 illustrates an exemplary mobile device 122 of the system of FIG. 6. As discussed above, the mobile device 122 may be configured as an autonomous vehicle, augmented reality device, etc. The mobile device 122 includes a processor 200, a map database 143, a memory 204, an input device 203, a communication interface 205, position circuitry 207, a distance detector 209, a display 211, and a camera 213. Additional, different, or fewer components are possible for the mobile device 122.

The distance detector 209 is configured to receive sensor data indicative of a roadside objects, such as light poles, signs, guard rails, bridges, etc. The distance detector 209 may emit a signal and detect a return signal. The signal may be a laser signal, a radio signal, or a sound signal. The distance detector 209 may determine a vector (distance and heading) from the position of the mobile device 122 to the position of the roadside objects. Alternatively or additionally, the camera 213 may be configured to receive sensor indicative of the roadside objects. Images collected by the camera 213 may be analyzed to determine the distance to the roadside objects. In one example, the number of pixels or relative size of the roadside objects indicates the distance. Smaller roadside objects are farther away. In another example, the relative differences between two or more images indicates the distance. For example, when two successive images are collected at a specific distance apart, the relative changes in the roadside objects indicates the distance to the roadside objects.

The position detector or position circuitry 207 is configured to determine a geographic position associated with mobile device 122 and the detected roadside objects. The geographic position may be determined based on a position of the vehicle when collecting the sensor data for the roadside objects and used by server 125 to update map database 123. Alternatively, the geographic position may be used to by processor 200 to match roadside objects detected by the distance detector 209 with map database 143 during a localization process.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The mobile device 122 may be integrated in a vehicle, which may include a data collection vehicle, assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the vehicle database 133 including the road object attribute. The autonomous vehicle senses the environment surrounding the vehicle using distance detector 209 and matches the environment to map database 143. The autonomous vehicle may also use position circuitry 207 to match the environment to the map database 143. For example, the autonomous vehicle senses roadside objects, and based on matching the objects to the map database, a position and orientation of the autonomous vehicle may be determined. After determining the position and orientation of the autonomous vehicle, the system may navigate and control the vehicle.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the vehicle database 133 including the road object attribute. The HAD vehicle senses the environment surrounding the vehicle using distance detector 209 and matches the environment to map database 143. The HAD vehicle may also use position circuitry 207 to match the environment to the map database 143. For example, the HAD vehicle senses roadside objects, and based on matching the objects to the map database, a position and orientation of the HAD vehicle may be determined. After determining the position and orientation of the HAD vehicle, the HAD vehicle may navigate and control the vehicle.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the traffic estimation level of a current or upcoming road link based on the vehicle database 133 including the road object attribute. The ADAS vehicle senses the environment surrounding the vehicle using distance detector 209 and matches the environment to map database 143. The ADAS vehicle may also use position circuitry 207 to match the environment to the map database 143. For example, the ADAS vehicle senses roadside objects, and based on matching the objects to the map database, a position and orientation of the ADAS vehicle may be determined. After determining the position and orientation of the ADAS vehicle, the ADAS vehicle may navigate and control the vehicle.

The mobile device 122 may generate a routing instruction based on the vehicle database 133. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on.

The mobile device 122 may plan a route through a road system, or modify a current route through a road system based on the matched probe data. The route may extend from a current position of the mobile device or an origin to a destination through the road segment matched with the probe data. Possible routes may be calculated based on a Dijkstra method, an A-star algorithm or search, and/or other route exploration or calculation algorithms that may be modified to take into consideration assigned cost values of the underlying road segments. Various other aspects, such as distance, non-navigable areas, and/or restrictions, may be considered in addition to the cost to determine an optimum route.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123, 133, 143, etc. may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface 211 may also include audio capabilities, or speakers. In an embodiment, the input device 203 may involve a device having velocity detecting abilities.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In an embodiment, data is captured and uploaded to cloud storage for offline analysis. For example, offline analysis may be conducted months after data collection in a map-making process. In another example, analysis may be performed in real-time to get a real-time characterization of an occlusion in the region of interest. LIDAR data for a region of interest is captured by a LIDAR sensor (e.g., on a data collection vehicle) and received by a cloud server. The LIDAR data is assembled as point cloud data in a spatial data structure and a grid representation of the region of interest is generated by evaluating the spatial data structure. Each square of the grid is characterized as a free square, an occupied square, or a hidden square. For example, characterizing each square comprises tracing LIDAR rays from sensor origin points to corresponding end points. The free squares correspond to locations between the sensor origin points and the corresponding end points, the occupied squares correspond to locations associated with the end points, and the hidden squares correspond to untraced locations. An occlusion is detected in the LIDAR data based on hidden squares of in grid representation and a localization model may be generated from the LIDAR data and the detected occlusion.

Figure 8:
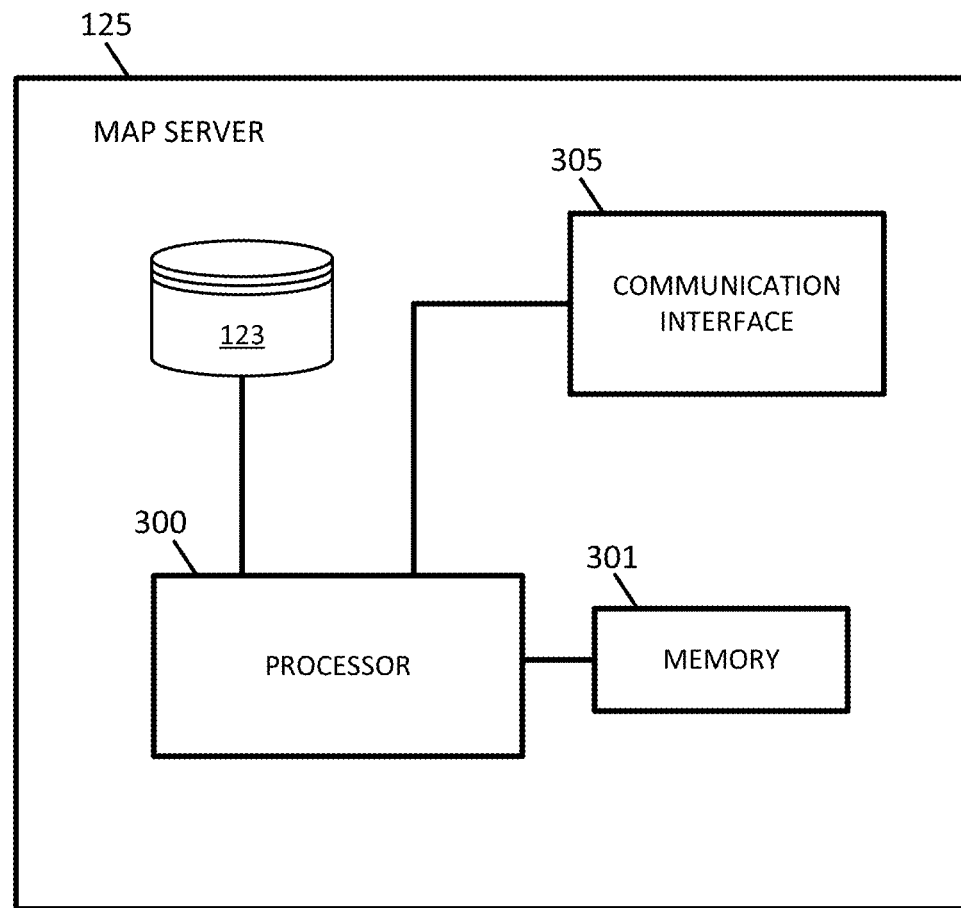
FIG. 8 illustrates an example server.
Figure 11:
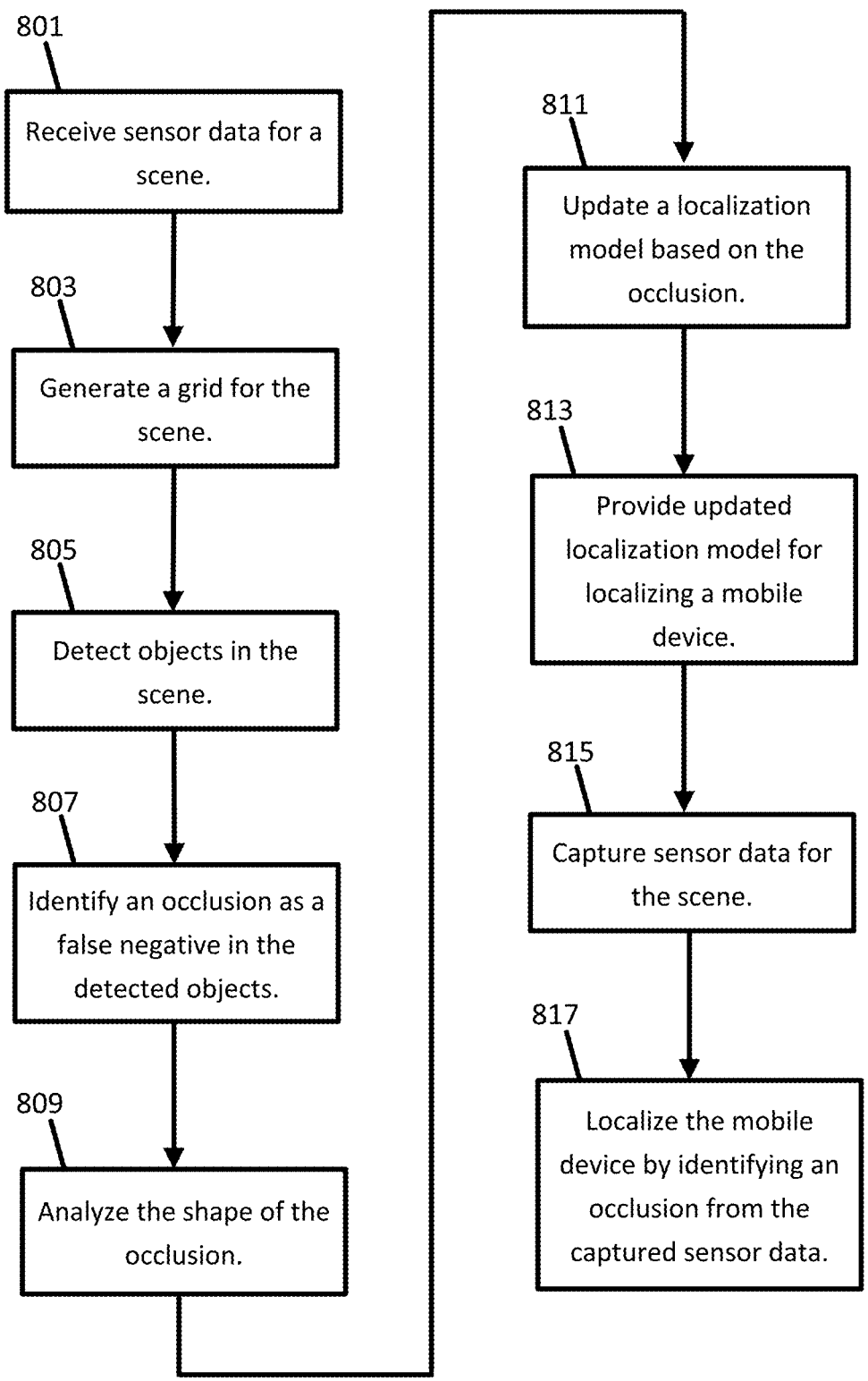
FIG. 11 depicts an example flowchart for detecting occlusions from sensor data.

FIG. 8 illustrates an example server 125, which may apply to the system of FIG. 6. The server 125 includes a processor 300, a communication interface 305, a memory 301, and a database 123. An input device (e.g., keyboard or personal computer) may be used to enter settings to the server 125. The database 123 may include the server map, such as including a lane model and a localization model. Additional, different, or fewer components may be provided in the server 125. FIGS. 5 and 11 (discussed below) illustrate example flowcharts for the operation of server 125. Additional, different, or fewer acts may be provided.

The geographic database 123 includes a lane model and a localization model. The lane model includes a map of the painted lines of a roadway, such as defining the lanes and boundaries of the roadway. The localization model includes a map of roadside objects extending from the roadway boundaries (e.g., 15 meters). The lane model and localization models may be two-dimensional (2D), three-dimensional (3D) or of another dimension n (e.g., n-dimensional (nD), with n>3).

The memory 301 is configured to store received sensor data for roadside objects. The memory 301 is configured to store data temporary from the database 123. Portions of the database 123 are loaded into memory 301 for comparison with the received sensor data.

The communication interface 305 is configured to receive sensor data from sensors of a plurality of data collection vehicles and/or mobile devices. The communication interface 305 also configured to transmit updated map data, such as lane and localization model updates, to mobiles devices, autonomous vehicles, navigation devices, and augmented reality devices.

The processor 300 is configured to detect occlusions in the received sensor data, as discussed above. The geographic database 123 is updated based on the detected occlusion. For example, the database 123 is updated with supplemental sensor data for the occlusion location, such as supplemental sensor data captured during targeted remapping. Alternatively or additionally, the database 123 is updated to report the location of the occlusion, such as a warning to proceed with caution or a warning indicating that unreported roadside objects may exist.

Figure 9:
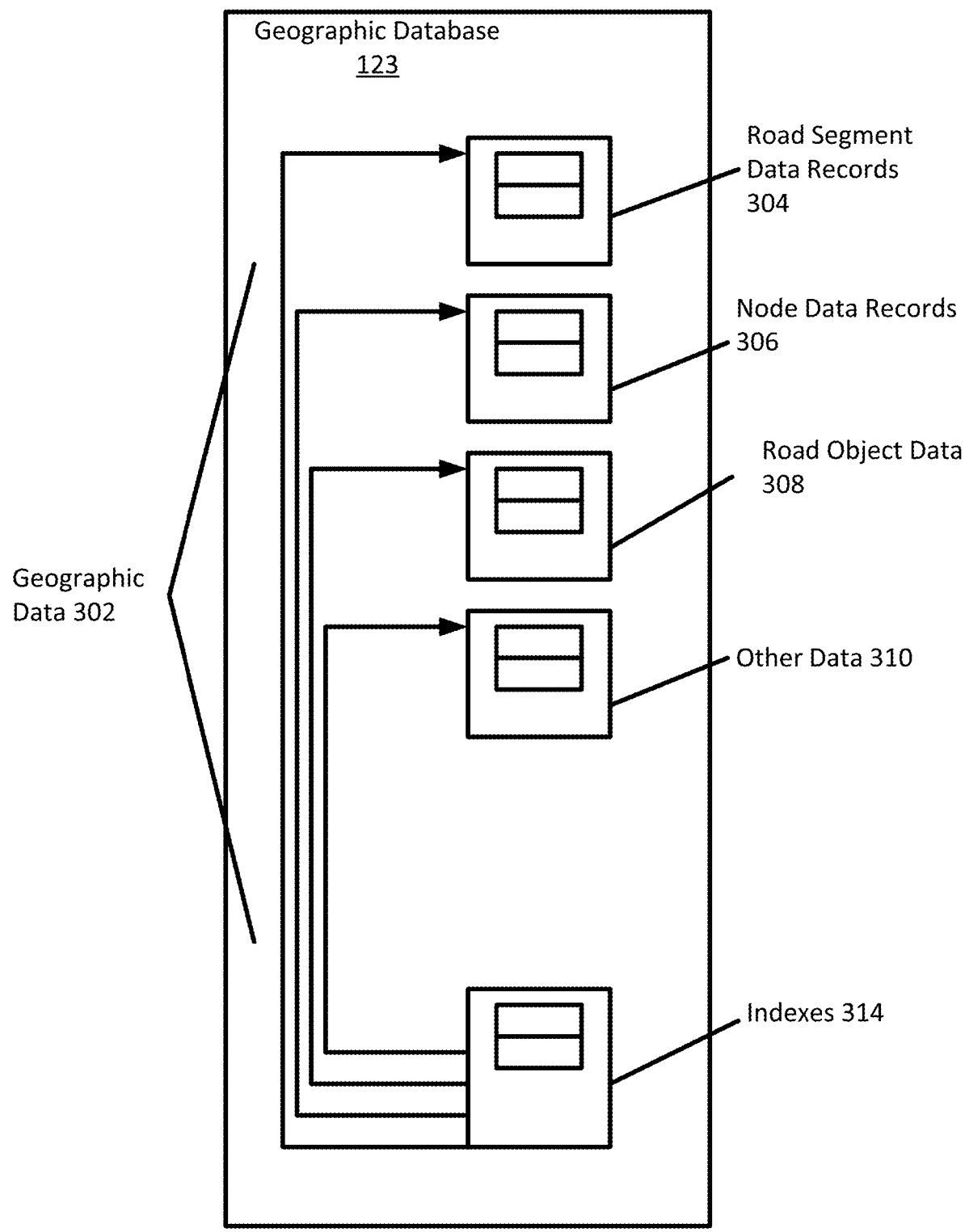
FIG. 9 illustrates an example geographic database.

In FIG. 9, the geographic database 123 may contain at least one road segment database record 304 (also referred to as "entity" or "entry") for each road segment in a particular geographic region. Any of the features of geographic database 123 may be applied to local databases 133. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include point of interest (POI) data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate road object data 308 (road object attributes) with a road segment in the segment data records 304 or a geographic coordinate. An index 314 may, for example, store data relating to one or more locations for the road object attribute 308 for each location. The road object attribute 308 may describe the type of road object, the relative location of the road object, an angle from the direction of travel to the road object, and/or a distance between the road segment and the road object.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 relevant for this invention are: temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 10:
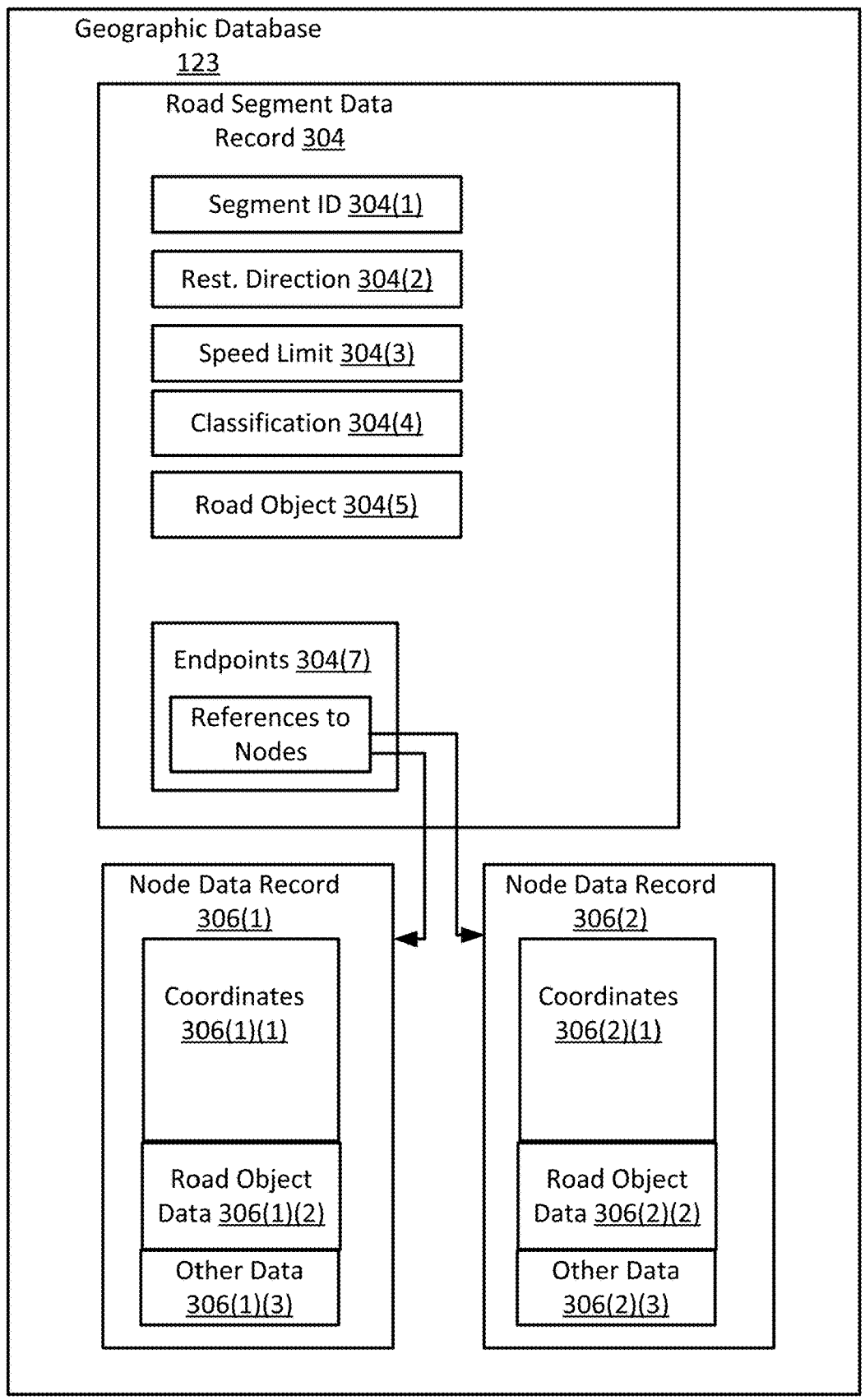
FIG. 10 illustrates another example geographic database.

FIG. 10 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes. The geographic database 123 may provide different display information relating to where open parking spots may exist, for example.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 10 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and road object data 306(1)(2) and 306(2)(2). For example, the road data objects 306(1)(2), 306(2)(2) may include localization information regarding roadside objects from a localization model, such as information regarding light poles, signs, guard rails, bridges, etc. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the predicted parking availability data stored in the geographic database 123. Data including the roadside objects for localizing an autonomous vehicle may also be stored.

FIG. 11 depicts an example flowchart for detecting occlusions from sensor data. The method is implemented by the system of FIGS. 6-10 (discussed below) and/or a different system. For example, referring to FIG. 8, acts 801-813 may be performed by the map server 125. Referring to FIG. 7, acts 815 and 817 may be performed by mobile device 122. Additional, different or fewer acts may be provided. The method is provided in the order shown. Other orders may be provided and/or acts may be repeated or performed in parallel.

At act 801, sensor data for a scene is received by the map server 125 and stored in the memory 301 and/or the database 123. For example, the sensor data includes ray data with an origin point and an end point. At act 803, a grid for the scene is generated by the processor 300 from the sensor data. For example, the grid is generated by tracing a path from the origin points to the end points to identify free space, occupied space and hidden space. At act 805, objects in the scene are detected by the processor 300 from the occupied spaces.

At act 807, an occlusion is identified from the hidden space by the processor 300. The occlusion represents a false negative in the detected objects. For example, the false negative corresponds to missing sensor data for a portion of the scene, such as a temporary object obstructing the scene from the sensor. Identifying the occlusion may also include determining a location and severity of the occlusion. For example, the severity of the occlusion may be a characterization of the occlusion as a full occlusion or partial occlusion.

At act 809, a shape of the occlusion is analyzed by the processor 300 to identify a source of the occlusion. At act 811, a localization model is updated in database 123 with additional sensor data for occlusion or by identifying the false negative for the occlusion, based on the analysis of the occlusion, as discussed above. At act 813, the localization model is provided from the map server 125 to a mobile device 122 for localizing the mobile device in the scene.

At act 815, sensor data is captured by the distance detector 209 of the mobile device 122 for localizing the mobile device in the scene. At act 817, the mobile device is localized by processor 200 by identifying an occlusion in the sensor data stored in memory 204 and based on the map database 143. For example, an autonomous vehicle detects occlusions in order to understand the scene around the vehicle.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment to streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Embodiment 1

A method of detecting an occlusion from point cloud data, the method comprising:
  receiving, by a server from a data collection vehicle, point cloud data for a scene;
  generating, by the server from the point cloud data, a grid representation of a region of interest in the scene, wherein the grid representation comprises free space, occupied space and hidden space; and
  identifying, by the server, an occlusion in the region of interest based on the hidden space of the grid representation.

Embodiment 2

The method according to embodiment 1, wherein the region of interest is defined based on a traffic lane model.

Embodiment 3

The method of any of the preceding embodiments 1 to 2, wherein the free space corresponds to a location between a sensor location and a corresponding object location identified from the point cloud data, the occupied space corresponds to the object location identified from the point cloud data, and the hidden space corresponds to a location without point cloud data.

Embodiment 4

The method of any of the preceding embodiments 1 to 3, further comprising:
  characterizing the occlusion based on a shape of the hidden space, the shape determined by connected component analysis of the hidden space.

Embodiment 5

The method of any of the preceding embodiments 1 to 4, wherein the occlusion is characterized as a temporary occlusion or a permanent occlusion.

Embodiment 6

The method of any of the preceding embodiments 1 to 5, further comprising:
  generating, by the server based on characterizing the occlusion as the temporary occlusion, a request for supplemental point cloud data for a location of the occlusion.

Embodiment 7

The method of any of the preceding embodiments 1 to 6, further comprising:
  updating, by the server, map database data based on the occlusion.

Embodiment 8

The method of any of the preceding embodiments 1 to 7, further comprising:
  providing, to an autonomous vehicle, the updated map database data for localizing the autonomous vehicle in the scene.

Embodiment 9

The method of any of the preceding embodiments 1 to 8, further comprising:
  storing, by the server, the point cloud data in a spatial data structure.

Embodiment 10

An apparatus for detecting an occlusion from light detection and ranging (LIDAR) data, the apparatus comprising:
  at least one LIDAR sensor;
  at least one processor; and
  at least one memory including computer program code for one or more programs, the at least one memory and the computer program code configured to, with the at least one processor, cause the apparatus to at least perform:
    receive, from the LIDAR sensor, LIDAR data for a region of interest;
    assemble the LIDAR data as point cloud data in a spatial data structure;
    generate a grid representation of the region of interest by evaluating the spatial data structure to characterize squares of the grid as a free square, an occupied square, or a hidden square;
    detect an occlusion in the LIDAR data based on hidden squares of the grid representation; and
    generate a localization model from the LIDAR data and the detected occlusion.

Embodiment 11

The apparatus according to embodiment 10, wherein the spatial data structure is a probabilistic octree.

Embodiment 12

The apparatus of any one of the preceding embodiments 10 to 11, wherein squares of the grid are characterized by tracing LIDAR rays from a sensor origin point to a corresponding end point.

Embodiment 13

The apparatus of any one of the preceding embodiments 10 to 12, wherein the free square corresponds to a location between the sensor origin point and the corresponding end point, the occupied square corresponds to a location associated with the end point, and the hidden square corresponds to an untraced location.

Embodiment 14

A non-transitory computer readable medium including instructions that when executed are operable to perform:
  receiving sensor data for a scene, the sensor data comprising a origin point and an end point;
  generating, from the sensor data, a grid for the scene, wherein generating the grid comprises tracing a path from the origin point to the end point to identify free space, occupied space and hidden space;
  detecting objects in the scene from the occupied space; and
  identifying, from the hidden space, an occlusion comprising a false negative in the detected objects.

Embodiment 15

The non-transitory computer readable medium according to embodiment 14, wherein the false negative comprises missing sensor data a portion of the scene.

Embodiment 16

The non-transitory computer readable medium of any one of the preceding embodiments 10 to 15, wherein the missing sensor data represents a temporary object obstructing the scene from the sensor.

Embodiment 17

The non-transitory computer readable medium of any one of the preceding embodiments 10 to 16, wherein identifying the occlusion comprises determining a location of the occlusion and a severity of the occlusion.

Embodiment 18

The non-transitory computer readable medium of any one of the preceding embodiments 10 to 17, wherein the severity comprises a characterization of the occlusion as a full occlusion or partial occlusion.

Embodiment 19

The non-transitory computer readable medium of any one of the preceding embodiments 10 to 18, further comprising:
  analyzing a shape of the occlusion to identify a source of the occlusion; and
  updating, based on the shape of the occlusion, a localization model with:
    additional sensor data for occlusion; or
    the identified false negative for the occlusion.

Embodiment 20

The non-transitory computer readable medium of any one of the preceding embodiments 10 to 19, further comprising:
  providing, to an autonomous vehicle, the localization model for localizing the autonomous vehicle in the scene.

We claim:

1. A method of detecting an occlusion from point cloud data, the method comprising:
  receiving, by a server from a data collection vehicle, point cloud data for a scene;
  generating, by the server from the point cloud data, a grid representation of a region of interest in the scene, wherein the grid representation comprises free space, occupied space and hidden space;
  identifying, by the server, an occlusion in the region of interest based on the hidden space of the grid representation, and
  characterizing the occlusion based on a shape of the hidden space, the shape determined by connected component analysis of the hidden space.

2. The method of claim 1, wherein the region of interest is defined based on a traffic lane model.

3. The method of claim 1, wherein the free space corresponds to a location between a sensor location and a corresponding object location identified from the point cloud data, the occupied space corresponds to the object location identified from the point cloud data, and the hidden space corresponds to a location without point cloud data.

4. The method of claim 1, wherein the occlusion is characterized as a temporary occlusion or a permanent occlusion.

5. The method of claim 4, further comprising:
  generating, by the server based on characterizing the occlusion as the temporary occlusion, a request for supplemental point cloud data for a location of the occlusion.

6. The method of claim 5, further comprising:
  updating, by the server, map database data based on the occlusion.

7. The method of claim 6, further comprising:
  providing, to an autonomous vehicle, the updated map database data for localizing the autonomous vehicle in the scene.

8. The method of claim 1, further comprising:
  storing, by the server, the point cloud data in a spatial data structure.

9. An apparatus for detecting an occlusion from light detection and ranging (LIDAR) data, the apparatus comprising:
  at least one LIDAR sensor;

at least one processor; and at least one memory including computer program code for one or more programs, the at least one memory and the computer program code configured to, with the at least one processor, cause the apparatus to at least perform:

receive, from the LIDAR sensor, LIDAR data for a region of interest;

assemble the LIDAR data as point cloud data in a spatial data structure;

generate a grid representation of the region of interest by evaluating the spatial data structure to characterize squares of the grid representation as a free square, an occupied square, or a hidden square;

detect an occlusion in the LIDAR data based on hidden squares of the grid representation based on a shape of the hidden squares, the shape determined by connected component analysis of the hidden squares; and generate a localization model from the LIDAR data and the detected occlusion.

10. The apparatus of claim 9, wherein the spatial data structure is a probabilistic octree.

11. The apparatus of claim 10, wherein squares of the grid are characterized by tracing LIDAR rays from a sensor origin point to a corresponding end point.

12. The apparatus of claim 11, wherein the free square corresponds to a location between the sensor origin point and the corresponding end point, the occupied square corresponds to a location associated with the end point, and the hidden square corresponds to an untraced location.

13. A non-transitory computer readable medium including instructions that when executed by a processor, the processor is operable to perform:

receiving sensor data for a scene, the sensor data comprising an origin point and an end point;

generating, from the sensor data, a grid for the scene, wherein generating the grid comprises tracing a path from the origin point to the end point to identify free space, occupied space and hidden space;

detecting objects in the scene from the occupied space; and identifying, from the hidden space, an occlusion comprising a false negative in the detected objects, wherein identifying the occlusion comprises determining a location of the occlusion and a severity of the occlusion.

14. The non-transitory computer readable medium of claim 13, wherein the false negative comprises missing sensor data a portion of the scene.

15. The non-transitory computer readable medium of claim 14, wherein the missing sensor data represents a temporary object obstructing the scene from the sensor.

16. The non-transitory computer readable medium of claim 13, wherein the severity comprises a characterization of the occlusion as a full occlusion or partial occlusion.

17. The non-transitory computer readable medium of claim 13, further comprising:

analyzing a shape of the occlusion to identify a source of the occlusion; and updating, based on the shape of the occlusion, a localization model with:

additional sensor data for occlusion; or the identified false negative for the occlusion.

18. The non-transitory computer readable medium of claim 17, further comprising:

providing, to an autonomous vehicle, the localization model for localizing the autonomous vehicle in the scene.

* * * * *

UNITED STATES PATENT AND TRADEMARK OFFICE
CERTIFICATE OF CORRECTION

PATENT NO.         : 10,552,689 B2
APPLICATION NO.    : 15/808277
DATED              : February 4, 2020
INVENTOR(S)        : David Doria Page 1 of 1

It is certified that error appears in the above-identified patent and that said Letters Patent is hereby corrected as shown below:

In the Claims

Claim 6, Column 24, Line 54. Delete "5" and insert -- 4 --.

Signed and Sealed this
Fifteenth Day of December, 2020

Andrei Iancu
*Director of the United States Patent and Trademark Office*